Patented Aug. 5, 1952

2,606,126

UNITED STATES PATENT OFFICE 2,606,126

LIGHTWEIGHT POROUS BUILDING MATERIALS

Herman Weber, Harriman, Tenn.

No Drawing. Application March 25, 1949,
Serial No. 83,517

3 Claims. (Cl. 106—87)

This invention relates to a non-hydrating, light-weight building material, such as porous stones, porous blocks, plates, insulations, etc., and, more particularly, to products of this kind manufactured from converted natural mineral anhydrite.

Natural rock anhydrite is the starting material for the manufacture of my new products, in which none or only a minimum of water of crystallization will be present after setting and drying.

It is an object of this invention to provide from said material porous products in a very simple and inexpensive manner.

Another object of the invention is a process of manufacturing products of this kind which requires a minimum of treatment and handling of the raw material.

Other objects and advantages of this invention will become apparent from the following specification thereof.

It has been found that light-weight building stones, plates, insulations, etc., can be manufactured from natural anhydrite, ground to pass 175 mesh screen, by the evolution of gases during the setting process, and, furthermore, it has been found that the necessary gases can be developed by the action of mineral acids, e. g., sulphuric acid on certain suitable siliceous material added to the raw material. No accelerator is required, as the setting agents are also liberated from the siliceous materials with the gas.

According to a preferred embodiment of my invention, natural rock anhydrite ($CaSO_4$) is ground to pass a 175 mesh sieve, mixed with appropriate amounts of suitable siliceous material and 2½–5% aqueous solution of sulphuric acid ($H_2SO_4$).

Suitable siliceous materials for this purpose are hydrated boiler or furnace cinders, or other hydrated combustion residues, smelter slags or those natural silicates such as olivine, nepheline and members of the Zeolite group, which decompose by action of mineral acids (e. g. sulphuric acid) with evolutions of gases and the liberation of setting and binding agents. The sulphuric acid utilized can be of technical grade, or waste acid from various industrial processes, such as the sulphonation of organic compounds.

When poured into molds, the mixture will expand due to the formation of gases and the liberation of setting agents resulting from the action of the acid on the siliceous materials to form porous stones, blocks, bricks, or plates suitable for interior walls and surfaces according to the properties noted.

Example 1

By weight:
  100 parts natural rock anhydrite
  70 parts hydrated fly ash
  50 parts aqueous sulphuric acid (5%)

| | Pounds per Square Inch After— | |
|---|---|---|
| | 7 days | 28 days |
| Compression Resistance | 500+ | 1,000+ |

Expansion, 25–30%; density, 0.9

This density can be controlled, by varying the amounts of acid or siliceous material used to cause the expansion. None or a very minimum amount of water of crystallization will be present. The blocks can be removed from the forms after six hours and are ready for use after drying in atmospheric storage for 8 to 10 days, or after being kiln dried at 50–80° C. for one day. The material is sawable, nailable, and fire resistant, and has excellent thermal and acoustical insulating properties.

It is to be noted that in this process, no hydration of the anhydrite is intended or achieved, but that the action of the acids on the siliceous materials produces the agents responsible for the binding.

I claim:

1. The process of manufacturing porous lightweight building materials, as stones, plates, blocks, insulations, etc., which consists in grinding natural rock anhydrite to pass 175 mesh screen; mixing 100 parts by weight of said ground natural rock anhydrite with about 50–80 parts of siliceous material which decomposes by the action of acid under an evolution of gas, said siliceous material being selected from the group consisting of hydrated combustion residues, fly ash, smelter slags, cinders; and adding weak solutions of mineral acids to said mixtures.

2. The process set forth in claim 1 in which 100 parts by weight of said natural anhydrite, ground to pass 175 mesh screen are mixed with 50 to 80 parts of siliceous material selected from the group consisting of hydraulic combustion residues, smelter slags, fly ash, cinders, according to the porosity and strength required; 2½ to 5% aqueous sulfuric acid are added; and the resulting mixture is poured into moulds for setting.

3. A new anhydrous quick-setting material for the manufacture of porous light-weight building materials comprising 100 parts by weight of natural rock anhydrite, ground to pass 175 mesh screen, and 50 to 80 parts of siliceous material selected from the group consisting of hydrated combustion residues, smelter slags, fly ash, burner cinders.

HERMAN WEBER.

REFERENCES CITED

The following references are of record in the file of this patent:

UNITED STATES PATENTS

| Number | Name | Date |
|---|---|---|
| 230,151 | Sanford | July 20, 1880 |
| 241,281 | Beers | May 10, 1881 |
| 1,033,984 | Brown | July 30, 1912 |
| 1,879,877 | Lefebure | Sept. 27, 1932 |
| 1,951,691 | Coxon | Mar. 20, 1934 |